(12) United States Patent
Marking (10) Patent No.: US 9,556,925 B2
(45) Date of Patent: Jan. 31, 2017

(54) SUSPENSION DAMPER WITH BY-PASS VALVES

(71) Applicant: FOX FACTORY, INC., Scotts Valley, CA (US)

(72) Inventor: John Marking, El Cajon, CA (US)

(73) Assignee: Fox Factory, Inc., Scotts Valley, CA (US)

( * ) Notice: Subject to any disclaimer, the term of this patent is extended or adjusted under 35 U.S.C. 154(b) by 138 days.

(21) Appl. No.: 13/750,336

(22) Filed: Jan. 25, 2013

(65) Prior Publication Data
US 2013/0228404 A1    Sep. 5, 2013

Related U.S. Application Data

(60) Provisional application No. 61/590,577, filed on Jan. 25, 2012.

(51) Int. Cl.
*F16F 9/44* (2006.01)
*F16F 9/34* (2006.01)
*F16F 9/46* (2006.01)
*F16F 9/06* (2006.01)

(52) U.S. Cl.
CPC ............... *F16F 9/466* (2013.01); *F16F 9/065* (2013.01); *F16F 9/446* (2013.01); *F16F 9/34* (2013.01)

(58) Field of Classification Search
CPC .................. F16F 9/48; F16F 9/49; F16F 9/34; F16F 9/3242; F16F 9/3214; F16F 9/061; F16F 9/065; F16F 9/325; F16F 9/46; F16F 9/0236; F16F 9/064
See application file for complete search history.

(56) References Cited

U.S. PATENT DOCUMENTS

| | | | | |
|---|---|---|---|---|
| 2,729,308 | A * | 1/1956 | Koski et al. | 188/284 |
| 3,202,413 | A * | 8/1965 | Colmerauer | 267/34 |
| 5,372,224 | A * | 12/1994 | Samonil et al. | 188/282.3 |
| 5,480,011 | A * | 1/1996 | Nagai et al. | 188/266.3 |
| 6,978,872 | B2 * | 12/2005 | Turner | 188/282.8 |
| 7,441,638 | B2 | 10/2008 | Hanawa | |
| 8,991,571 | B2 * | 3/2015 | Murakami | 188/289 |
| 2006/0124414 | A1 * | 6/2006 | Hanawa | 188/314 |

* cited by examiner

*Primary Examiner* — Anna Momper (57) ABSTRACT

A vehicle damper is described. The vehicle damper includes: a cylinder; a piston within the cylinder; a working fluid within the cylinder; a reservoir in fluid communication with the cylinder via the working fluid, the reservoir operable to receive the working fluid from the cylinder in a compression stroke; a valve in a flow path between the cylinder and the reservoir; and a remotely-operable valve having a position allowing the working fluid to significantly by-pass the valve.

22 Claims, 3 Drawing Sheets

SUSPENSION DAMPER WITH BY-PASS VALVES

CROSS-REFERENCE TO RELATED APPLICATIONS

This application claims priority to and benefit of co-pending U.S. Patent Application No. 61/590,577 filed on Jan. 25, 2012 entitled "SUSPENSION DAMPER WITH BY-PASS VALVES" by John Marking, and assigned to the assignee of the present application, which is herein incorporated by reference.

This application is related to U.S. Provisional Patent Application No. 61/366,871 filed on Jul. 22, 2010 entitled "LOCK-OUT VALVE FOR A SUSPENSION DAMPER" by John Marking, assigned to the assignee of the present application, which is herein incorporated by reference and U.S. Provisional Patent Application No. 61/381,906, filed on Sep. 10, 2010 entitled "REMOTELY ADJUSTABLE SUSPENSION DAMPER" by John Marking, assigned to the assignee of the present application, which is herein incorporated by reference. This application is related to U.S. Provisional Patent Application No. 61/366,871, and corresponding co-pending U.S. patent application Ser. No. 13/189,216 filed on Jul. 22, 2011 entitled "SUSPENSION DAMPER WITH REMOTELY-OPERABLE VALVE" by John Marking, assigned to the assignee of the present application, each of which is incorporated entirely herein by reference.

This application is also related to co-pending U.S. patent application Ser. No. 13/010,697 filed on Jan. 20, 2011 entitled "REMOTELY OPERATED BYPASS FOR A SUSPENSION DAMPER" by John Marking, assigned to the assignee of the present application, which is herein incorporated by reference and claims priority to and benefit of U.S. Provisional Patent Application No. 61/296,826 filed on Jan. 20, 2010 entitled "BYPASS LOCK-OUT VALVE FOR A SUSPENSION DAMPER" by John Marking, assigned to the assignee of the present application, which is herein incorporated by reference. Co-pending U.S. patent application Ser. No. 13/010,697 is a continuation-in-part application of and claims priority to and the benefit of co-pending U.S. patent application Ser. No. 12/684,072 filed on Jan. 7, 2010 entitled "REMOTELY OPERATED BYPASS FOR A SUSPENSION DAMPER" by John Marking, and assigned to the assignee of the present application, and is herein incorporated by reference, which claims priority to and benefit of U.S. Provisional Patent Application No. 61/143,152 filed on Jan. 7, 2009 entitled "REMOTE BYPASS LOCK-OUT" by John Marking, assigned to the assignee of the present application, which is herein incorporated by reference.

This application is also related to co-pending U.S. patent application Ser. No. 12/684,072 filed on Jan. 7, 2010 entitled "REMOTELY OPERATED BYPASS FOR A SUSPENSION DAMPER" by John Marking, and assigned to the assignee of the present application, and is herein incorporated by reference, which claims priority to and benefit of U.S. Provisional Patent Application No. 61/143,152 filed on Jan. 7, 2009 entitled "REMOTE BYPASS LOCK-OUT" by John Marking, assigned to the assignee of the present application, which is herein incorporated by reference. This application is also related to co-pending U.S. Provisional patent application Ser. No. 13/175,244 filed on Jul. 1, 2011 entitled "BYPASS FOR A SUSPENSION DAMPER" by John Marking, assigned to the assignee of the present application, which is herein incorporated by reference, which claims priority to and the benefit of U.S. Provisional Patent Application No. 61/361,127 filed on Jul. 2, 2010 entitled "BYPASS LOCK-OUT VALVE FOR A SUSPENSION DAMPER" by John Marking, and assigned to the assignee of the present application, and is herein incorporated by reference.

The technologies disclosed herein may be used in suitable combination with any or all of the technologies disclosed in the foregoing related patent applications.

BACKGROUND

Embodiments of the invention generally relate to a damper assembly for a vehicle. More specifically, certain embodiments relate to valves used in conjunction with a vehicle damper.

Vehicle suspension systems typically include a spring component or components and a dampening component or components. Typically, mechanical springs, like helical springs, are used with some type of viscous fluid-based dampening mechanism and the two are mounted functionally in parallel. In some instances features of the damper or spring are user-adjustable. What is needed is an improved method and apparatus for varying dampening characteristics.

BRIEF DESCRIPTION OF THE DRAWINGS

The drawings referred to in this description should not be understood as being drawn to scale unless specifically noted.

DESCRIPTION OF EMBODIMENTS

Reference will now be made in detail to embodiments, examples of which are illustrated in the accompanying drawings. While the technology will be described in conjunction with various embodiment(s), it will be understood that they are not intended to be limited to these embodiments. On the contrary, the present technology is intended to cover alternatives, modifications and equivalents, which may be included within the spirit and scope of the various embodiments as defined by the appended claims.

Furthermore, in the following detailed description, numerous specific details are set forth in order to provide a thorough understanding of embodiments. However, embodiments may be practiced without these specific details. In other instances, well known methods, procedures, components, and circuits have not been described in detail as not to unnecessarily obscure aspects of embodiments.

The discussion that follows will describe the structure and functionality of embodiments.

Figure 1A:
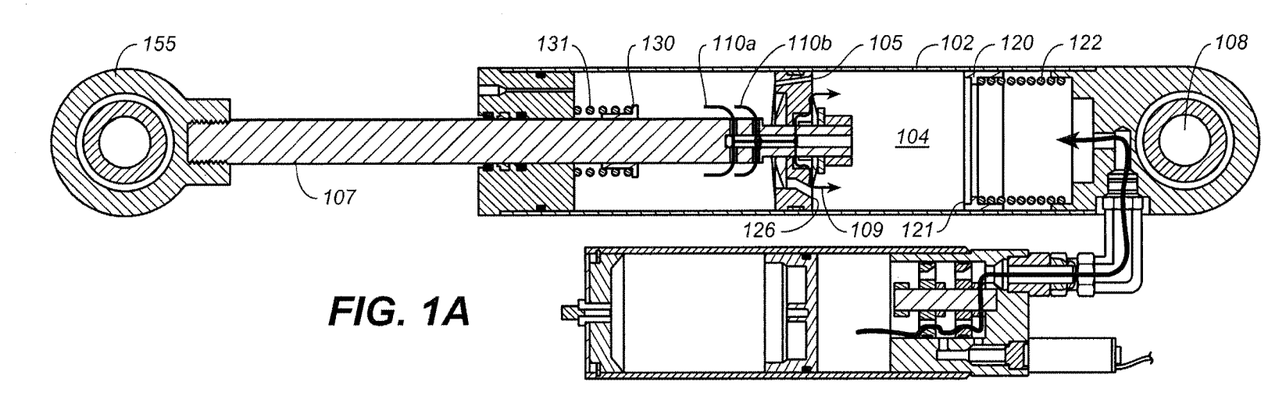
FIG. 1A illustrates a section view of a suspension damper, in accordance with an embodiment.
Figure 1B:
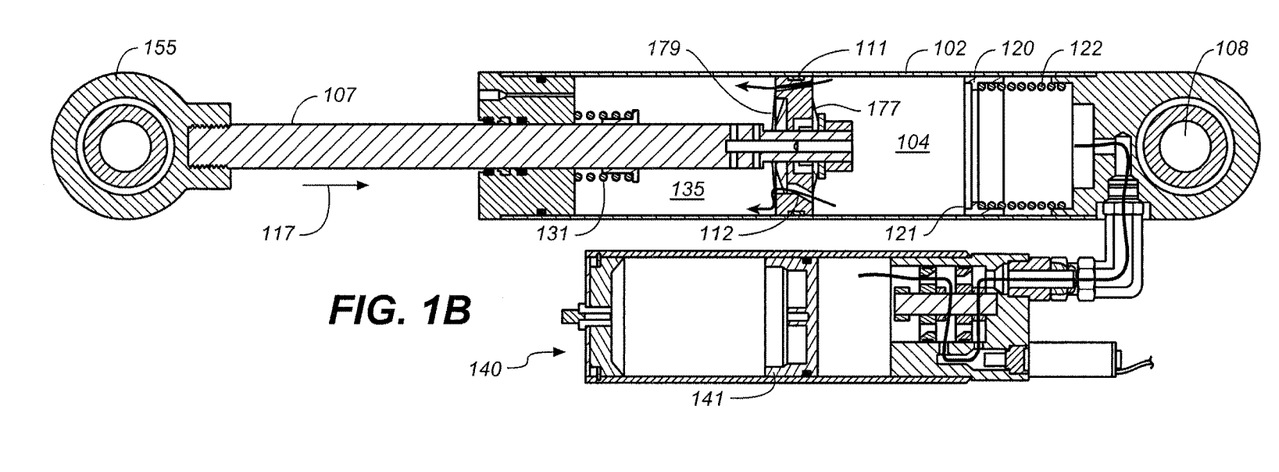
FIG. 1B illustrates a section view of a suspension damper, in which the damper piston of the suspension damper is moving in a compression stroke, in accordance with an embodiment.

As used herein, the terms "down," "up," "downward," "upward," "lower," "upper" and other directional references are relative and are used for reference only. FIGS. 1A and 1B are a section view of a suspension damper 100. The suspension damper 100 includes a cylinder portion 102 with a damper rod 107 and a damper piston 105. In one embodiment, fluid meters from one side of the damper piston 105 to the other side by passing through flow paths (at least one flow path) formed in the damper piston 105. In the embodiment shown, shims (at least one shim) are used to partially obstruct flow paths through the damper piston 105 in two directions. By selecting shims having certain desired stiffness characteristics, the dampening effects caused by the damper piston 105 can be increased or decreased and dampening rates can be different between the compression and rebound strokes of the damper piston 105.

Figure 2A:
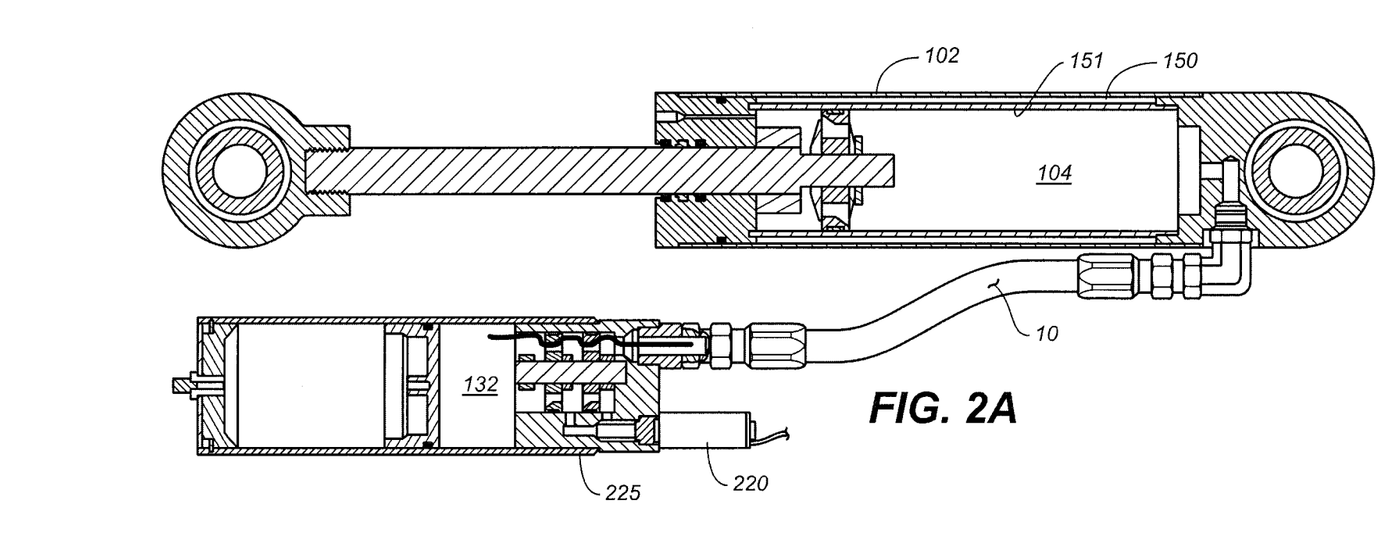
FIG. 2A illustrates a section view of a suspension damper, in accordance with an embodiment.

In FIG. 1B, the damper piston is moving in a compression stroke (as shown by directional arrow 117) with the damper rod 107 and damper piston 105 moving further into the compression portion 104 and causing fluid to flow from a compression portion 104 to a rebound chamber 135 of the rebound side of the cylinder portion 102 via flow paths 112 and 111. Note that damper piston apertures (not shown) may be included in planes other than those shown (e.g. other than apertures used by paths 111 and 112) and further that such apertures may, or may not, be subject to the shims as shown (because for example, the shims may be clover-shaped or have some other non-circular shape). In one embodiment, the damper piston 105 is solid and all damping flow must traverse a flow bypass (e.g. as shown in FIG. 2A space 150 between cylinder 102 and inner wall 151 within the cylinder 102) and/or communicate with a reservoir.

As shown in FIG. 1 B, compression stroke flow may traverse the damper piston 105 via a first flow path 112 (e.g., an in board flow path) and/or via a second flow path 111 (e.g., an out board flow path). The second flow path 111 is unrestricted and allows by-pass so that the damper piston may travel more freely in compression. The first flow path 112 is restricted by shims and provides more rigid compression damping flow (hence suspension movement).

The compression portion 104 is partially defined by the first side 177 of the piston 105. The rebound chamber 135 is partially defined by the second side 179 of the piston 105.

A by-pass shut off valve 120 is located toward an end of the compression portion 104 of cylinder 102 and is biased away from that end by spring 122. During a compression stroke the damper piston 105 moves toward the by-pass shut off valve until the surface 121 abuts a radially outer portion of leading surface 126 of damper piston 105. When such abutment occurs the annular surface 121 covers all by-pass ports 111 (flow path 111) located along the outer edge of the damper piston 105 thereby closing off the compression fluid bypass through those ports. Remaining compression fluid must traverse the damper piston 105 via ports 112 where that fluid will be subject to restriction of the compression shims. Following contact with the ring of the by-pass shut off valve 120 further movement of damper piston 105 compresses spring 122 thereby allowing the ring of the by-pass shut off valve 120 to move with the damper piston 105 toward the end of the compression stroke.

In FIG. 1A, the damper piston is moving in a rebound stroke (opposite that shown by directional arrow 117 of FIG. 1 B) with the damper rod 107 and damper piston 105 moving further out of the compression portion 104 and causing fluid to flow from a rebound chamber 135 of the rebound to a compression portion 104 of the cylinder portion 102 via flow paths 110A, 110B, and 109. Note that damper piston apertures 109 may be included in planes other than those shown (e.g. other than apertures used by paths 110 and 109) and further that such apertures may, or may not, be subject to the shims as shown (because for example, the shims may be clover-shaped or have some other non-circular shape). In one embodiment, the damper piston 105 is solid and all damping flow must traverse a flow bypass (e.g. as shown in FIG. 2A, space 150 between cylinder 102 and the inner wall 151 within the cylinder 102) and/or communicate with a reservoir.

In the embodiment of FIG. 1A, fluid within rebound chamber 135 fluid flows into flow paths 110 (first set of radially outward directed paths) as the damper rod 107 moves outward from cylinder compression portion 104. Rebound flow moves from paths 110 to a central flow path within the damper rod 107 and then to one or more (a second set) radially outward directed paths 109 which traverse shim valves before opening into compression chamber 104. The rebound fluid flow is thereby at least partially restricted by the shims although such restriction may be minimal or non-existent if the shims are not present or are by-passed.

When the rebounding damper rod 107 has moved outward far enough, the flow paths (ports or apertures) 110 reach shut off valve (first shut off valve) 130. As ports 110A are covered by an inner diameter of shut off valve sleeve 130 (first sleeve), rebound fluid flow there through is correspondingly shut off. Rebound fluid flow is substantially closed when further movement of damper rod 107 places ports 110B under sleeve 130. The sequential closing of the ports 110A and 110B facilitates a gradual increase in rebound damping with damper rod position during rebound stroke. It is noted that axially displaced port sets 110A and 110B are exemplary and that more axially displaced port sets may be located at distances along the damper rod 107 to increase the sequential increase of the damping function. It is also noted that the damper rod 107 may be extended further out of the compression side of the damper piston 105 and such extension may include radially situated axially spaced flow ports like 110A and 110B which would engage with an inner diameter of a sleeve like shut off valve sleeve 130 in place of the ring of the by-pass shut off valve 120 to create a sequential damping by-pass reduction during a compression stroke.

In the embodiment of FIG. 2A, the damper includes an annular bypass formed between a wall of cylinder portion 102 and an inner wall 151 having a slightly smaller diameter than the cylinder wall. In this manner a space 150 is provided between the walls. (In one embodiment, the space 150 is annular.) In one embodiment, at least one port through wall 151 on the compression side of the cylinder and another port through wall 151 on the rebound chamber 135 of the rebound side permit working fluid to pass between the compression portion 104 and the rebound chamber 135 of the rebound side without moving through the shimmed paths provided by the damper piston 105. The bypass feature is utilized so long as the damper piston is between the two ports in either the compression or rebound strokes.

The lower portion of the damper rod 107 is supplied with a bushing set 155 for connecting to a portion of a vehicle wheel suspension linkage. An upper portion of the cylinder portion 102 may be supplied with an eyelet 108 to be mounted to another portion of the vehicle, such as the frame, that moves independently of the first part. A spring member (not shown) is usually mounted to act between the same portions of the vehicle as the damper. As the damper rod 107 and damper piston 105 move into cylinder portion 102 (during compression), the damping fluid slows the movement of the two portions of the vehicle relative to each other due, at least in part, to the incompressible fluid moving through the shimmed paths provided in the damper piston 105 and/or through the metered bypass. As the damper rod 107 and damper piston 105 move out of the cylinder portion 102 (during extension or "rebound") fluid meters again through shimmed paths and the flow rate and corresponding rebound rate may be controlled, at least in part, by the shims.

A reservoir 140 is in fluid communication with the damper cylinder 102 for receiving and supplying damping fluid as the damper piston damper rod 107 moves in and out of the cylinder portion 102 thereby variably displacing damping fluid. The reservoir 140 includes a cylinder portion in fluid communication with the compression portion 104 of the damper cylinder portion 102 via a fluid conduit 10 which houses a fluid path between the components. The reservoir 140 also includes a floating damper piston 141 with a volume of gas in a gas portion on a backside ("blind end" side) of it, the gas being compressible as a damping fluid portion 132 of the cylinder of the reservoir fills with damping fluid due to movement of the damper rod 107 into the damper cylinder 102. The pressure of gas in the reservoir can be adjusted with compressed air introduced through a gas valve located at a lower end of the reservoir cylinder. Certain features of reservoir-type dampers are shown and described in U.S. Pat. No. 7,374,028, which is incorporated herein, in its entirety, by reference. In one embodiment the damper includes an in-line reservoir (e.g. floating damper piston and gas charge) rather than a remote reservoir as shown in the Figures. The principles disclosed herein are equally applicable in either case.

Figure 2B:
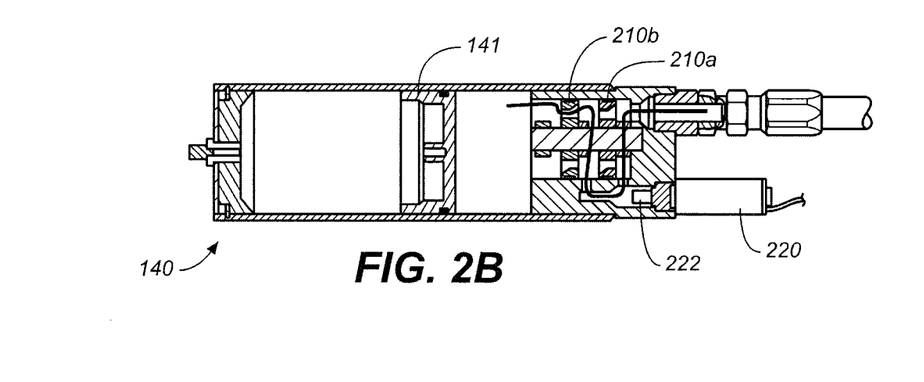
FIG. 2B illustrates a section views of the reservoir 140 showing valves of the valve assembly in various positions during a compression stroke of the damper, in accordance with an embodiment.

In one embodiment, the damping characteristics of the damper are altered by at least one valve that regulates flow between the compression chamber 104 and the fluid portion 132 of the reservoir 140. In the particular embodiment shown a reservoir valve assembly includes valves 210a, 210b, and 220, each of which (monitors) permits, prevents or impedes fluid flow into the reservoir fluid portion 132. The valves 210a, 210b, and 220 are shown in more detail in FIGS. 1A, 1B, 2A and 2B. FIG. 2B shows section views of the reservoir 140 showing valves of the valve assembly in various positions during a compression stroke of the damper.

In one embodiment, the reservoir valve assembly is attached at an upper end of the cylinder portion of the reservoir 140 and serves to seal the fluid portion 132. Valves 210 includes a pathway leading from the fluid conduit 10 into the fluid portion 132 of the reservoir. One or both of valves 210a and 210b includes shims (a first set of shims [wherein the first set includes one or more shims]) functionally like those used in damper piston 105 and designed to offer predetermined resistance to fluid flow passing into the reservoir 140 during compression of the damper. Another set of shims (a second set of shims [wherein the second set includes one or more shims]) of valves 210a and 210b meter the flow of fluid out of the fluid portion 132 of the reservoir 140 during a rebound stroke of the damper. The flow of fluid into and through valves 210 during a compression stroke is shown by arrows. As shown, the flow of fluid has un-seated shims to permit the flow of fluid into the fluid portion 132.

In one embodiment, the reservoir also includes a remotely-operable valve 220 and includes a movable plunger 222 that is substantially sealable on a seat 225. In FIG. 2B the valve 220 is open with a fluid path there through shown by an arrow. While FIG. 2B shows both all valves open and fluid flow by-passing valve 210a, it will be understood that depending upon the design of the system, including the selection of shims, valve 210a could remain closed and fluid might flow only through valve 220 that is open or alternatively fluid may flow through both valve 210a and valve 220 simultaneously albeit in selected proportions.

In FIG. 2A remotely-operable valve 220 is shown in a closed position with the plunger 222 seated upon seat 225. In the embodiment shown, the valve 220 is shifted between an open and closed position by a solenoid located adjacent the valve and capable of receiving an electrical signal and causing the mechanical movement of the plunger 222. In one embodiment, the solenoid operates in a "stepper" manner having selectable stroke (e.g. based on electric signal input) that partially closes or partially opens the valve 220, thereby permitting or restricting flow without completely opening or closing the valve (e.g. as in an infinitely variable throttle operating between absolute open and absolute closed positions).

In one embodiment (shown in Figures), the solenoid valve (which alternatively may be operated by hydraulic cylinder) modulates flow through and around valve 210a while flow through valve 210b occurs under all circumstances. As such, valve 210b provides a positive "base" damping resistance regardless of whether compliant damping (valve 220 open) or more rigid damping (valve 220 closed) is selected. Such positive base damping helps the damper avoid cavitation during extremely rapid compression.

In one embodiment, the solenoid-operated valve 220 is normally open (as shown in FIG. 2B) with working or damping fluid permitted to flow through both valves 210, 220 of reservoir. In the early portion of the compression stroke, additional fluid may also bypass the shims of damper piston 105 due to the space 150 (e.g., an annular bypass) with its ports (FIG. 2A). The foregoing configuration describes a "compliant" damping mode with reduced dampening which is suitable for "plush" shock absorption. Such mode may also allow a so-equipped vehicle to pitch or roll during braking or cornering respectively however. As such, while compliant damping is sometimes preferable (e.g. extremely rough terrain) but there are times when a more rigid damping mode is appropriate (e.g. on-highway). In one embodiment, the normally-open solenoid valve 220 may be, at the user's discretion, partially or completely closed as it appears in FIG. 2A, to increase a damping rate of the damper and hence its rigidity.

In some instances, it may be desirable to increase the damping rate when moving a vehicle from off-road to on highway use. Off-road use often requires a high degree of compliance to absorb shocks imparted by the widely varying terrain. During highway use, particularly with long wheel travel vehicles, often requires more rigid shock absorption is often required to allow a user to maintain control of a vehicle at higher speeds. This may be especially true during cornering or braking.

In other instances, it is desirable to control/change dampening characteristics in a rebound stroke of a damper. In one embodiment, the damper operates with fluid traveling through the valves 210A, 210B, and 220 during a rebound stroke. In FIG. 2B, both valves are also open to the flow of return fluid opposite the flow arrow although the arrow shows compression flow. The reduced rebound dampening effects permit the shock absorber to extend faster than would otherwise be possible. Such a setting is important in an instance where terrain is encountered that results in a sudden "drop" of the ground away from a wheel or wheels of the vehicle. With the remotely-operable valve 220 in a closed position, additional dampening is added to that created by the rebounding damper piston 105.

One embodiment comprises a four wheeled vehicle having solenoid valve-equipped shock absorbers at each (of four) wheel. The valve 220 (which in one embodiment is cable (mechanically), pneumatically, or hydraulically operated instead of solenoid operated) of each of the front shock absorbers may be electrically connected with a linear motion activated switch (such as that which operates an automotive brake light) that is activated in conjunction with the vehicle brake pedal. When the brake pedal is depressed beyond a certain distance, corresponding usually to harder braking and hence potential for vehicle nose dive, the electric switch connects a power supply to the normally open solenoid in each of the front shocks, thereby closing the valve in those shocks. As such, the front shocks become more rigid during hard braking. Other mechanisms may be used to trigger the shocks such as accelerometers (e.g., tri-axial) for sensing pitch and roll of the vehicle and activating, via a microprocessor, the appropriate solenoid valves for optimum vehicle control.

In one embodiment, a vehicle steering column includes right turn and left turn limit switches such that a hard turn in either direction activates (e.g. closes valve 220) the solenoid on the shocks opposite that direction (for example a hard right turn would cause more rigid shocks on the vehicle left side). Again, accelerometers in conjunction with a microprocessor and a switched power supply may perform the solenoid activation function by sensing the actual g-force associated with the turn (or braking; or throttle acceleration for the rear shock activation) and triggering the appropriate solenoid(s) at a preset threshold g-force.

In one embodiment, a pressure intensifier damper arrangement may be located within the fluid path of the remotely-operable valves 220 such that the valve 220 controls flow through that auxiliary damper which is then additive with the valve assembly. In one embodiment the valve assembly comprises a pressure intensifier (such as described in U.S. Pat. No. 7,374,028 which is incorporated, entirely, herein by reference). The following is a description, with reference to FIGS. 3A and 3B, of a pressure intensifier damper arrangement that is described in U.S. Pat. No. 7,374,028.

Figure 3A:
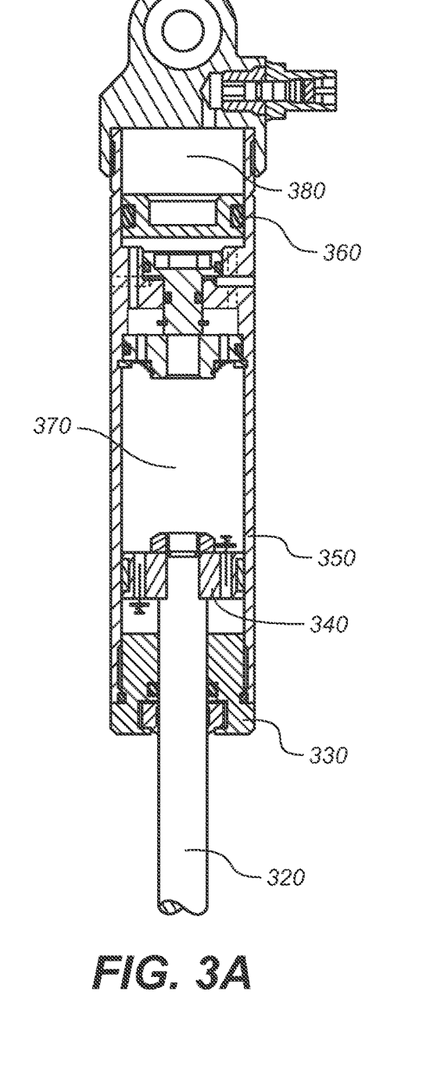
FIGS. 3A and 3B show an example intensifier piston (as described and shown in U.S. Pat. No. 7,374,028) of a pressure intensifier damper arrangement, in accordance with an embodiment.
Figure 3B:
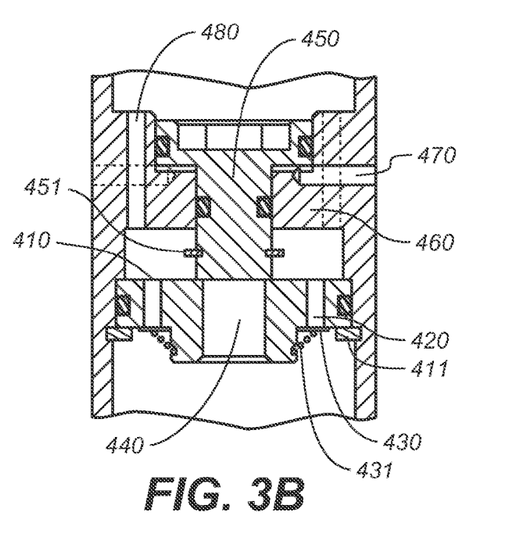

Referring now to FIGS. 3A and 3B, the intensifier piston 350 of a pressure intensifier damper arrangement is shown in the context of embodiments relating to U.S. Pat. No. 7,374,028. A partition 310 is secured within the bore of the damper by a partition retaining ring 311. This partition 310 physically divides the hydraulic fluid into one portion above the partition 310, and another portion below it. The partition 310 has a plurality of rebound flow ports 320 covered by a check valve 330 which is lightly biased in contact with the partition 310 by a relatively soft check valve spring 331. Additionally, the partition 310 has a central compression flow port 340 which, in the position illustrated in FIG. 3B, is blocked at its upper end by the small end of an intensifier piston 350.

The intensifier piston 350 is located within an intensifier housing 360, which can be integral with the damper cylinder 350 (as shown), or can be a separate structure sealed and retained within the bore of the damper cylinder 350. During upward movement of the intensifier piston 350 as occurs during operation (to be described in detail further on), the intensifier piston 350 is prevented from exiting the intensifier housing 360 by the intensifier retaining ring 351. The intensifier piston 350 is sealingly engaged with the intensifier housing 360 at its upper (large diameter) end, as well as at its lower (smaller diameter) end. There is at least one vent port 370 which vents the space between the upper and lower seals of the intensifier piston 350 to outside atmospheric pressure. There is also at least one bi-directional flow port 380 which passes vertically through intensifier housing 360.

Still referring to FIGS. 3A and 3B, the pressure intensifier 350 of a pressure intensifier damper arrangement is described in the following paragraphs.

During a rebound stroke, the piston rod 320 is withdrawn from the damper cylinder 350, resulting in some amount of vacated volume toward the lower end of the damper cylinder 350. As described previously, this results in downward movement of the floating piston 360, as well as a downward flow of the hydraulic fluid 370 immediately below it. Since downward movement of the floating piston 360 reduces the space between the floating piston 360 and the partition 410, and since hydraulic fluid is incompressible, hydraulic fluid flows down through the bi-directional flow port(s) 480. It then flows down through the partition 410 via the rebound flow port(s) 320. It does this by opening the check valve 330 against the relatively light resistance of the check valve spring 431.

During a compression stroke, the piston rod 320 and the damping piston 340 move further into the damper cylinder 350, thus displacing a volume of the hydraulic fluid 370 equal to the volume of the additional length of the piston rod 320 which enters the damper cylinder 350. As described previously, this results in an upward flow of the displaced volume of hydraulic fluid, accommodated by an upward movement of the floating piston 360, which somewhat decreases the volume, and increases the pressure, in the internally-pressurized chamber 380. However, in order to do so, the displaced volume of hydraulic fluid must first pass through the partition 310. In accordance with the known principles of hydraulic intensifiers, to achieve this, the fluid must create an upward force (pressure) at the lower (small) end of the intensifier piston 450 which is sufficient to overcome the downward force (pressure) at the upper (large) end of the intensifier piston 350. To do so requires a pressure at the lower end of the intensifier piston 450 that is greater than the pressure at the upper end of the intensifier piston 450 by a multiple approximately equal to the ratio of the cross-sectional area of the large end of the intensifier piston 450 to the cross-sectional area of the compression flow port 440.

For simplicity, it is assumed that the diameter of the small end of the intensifier piston 450 is only slightly greater than the diameter of the compression flow port 440. Thus, the annular contact area between these parts is relatively quite small, and it can be said that, for flow through the compression flow port 440, a pressure is required at the lower end of the intensifier piston 450 that is greater than the pressure at the upper end of the intensifier piston 450 by a multiple approximately equal to the ratio of the area of its large end divided by the area of its small end.

This pressure differential (multiple) between the small end and large end of the pressure intensifier 450 creates a compression damping effect in the damper.

Here is an example. Assume the diameter of the large end of the intensifier piston 450 is twice the diameter of the small end, and thus that the ratio of their cross-sectional areas is 4:1. Assume the diameter of the piston rod 320 is O½", and thus it has a cross-sectional area of about 0.2 square inches. Assume the damping piston 340 has traveled inward into the damper cylinder 350 some distance (i.e., it is not fully-extended or "topped-out" against the seal head 330), as shown in FIG. 3A. Assume that the pressure of the internally-pressurized chamber 380 above the floating piston is 100 psi. Assume static conditions, with the damping piston 340 not moving. Given these assumptions, and based on elementary principles, there is a uniform pressure of 100 psi throughout the interior of the damper. Furthermore, it can be readily calculated that, under these static conditions, the 100 psi internal pressure acting on the 0.2 square inch cross-sectional area of the piston rod 320 creates a 20-pound force tending to extend the piston rod 320. In racing circles, this 20-pound force is sometimes referred to as "static nose force".

The above described static conditions. Now the compression damping effect produced by the intensifier piston 450 during a compression stroke (inward movement of the piston rod 320) is described. Per basic principles, for an intensifier piston 450 with a cross-sectional area ratio of 4:1, a pressure of approximately 400 psi at the small end is required to overcome the 100 psi pressure at the large end (which originates from the internally-pressurized chamber 380 above the floating piston 360), in order to cause the intensifier piston 450 to move upward, thus unblocking the compression flow port 440 and allowing upward flow of the hydraulic fluid 370 displaced by the inward movement of the piston rod 320.

For simplicity, it is assumed in the following discussion that the damping piston 340 has several large thru-holes and no restrictive valving (note that, actually, the exemplary embodiments of the present invention generally do incorporate restrictive valving on the damping piston 340 which does create compression damping forces). In other words, for purposes of clarity in describing the basic principles of the present embodiment, it is assumed here that the damping piston 340 itself creates no compression damping forces. Now, the 400 psi pressure created at the small end of the intensifier piston 450 acts uniformly throughout all portions of damper cylinder 350 below the intensifier piston 450. Acting on the 0.2 square inch cross-sectional area of the piston rod 320, it creates an 80-pound "dynamic nose force". The difference between the previous 20-pound "static nose force" and this 80-pound "dynamic nose force" is 60 pounds; this 60 pounds represents the compression damping force produced by the present embodiment. Increasing the diameter and cross-sectional area of the piston rod 320, of course, would create an even greater damping force.

To further describe the intensifier piston 450, in terms of an example operational application, in the following it will be assumed that the above compression stroke continues inward for a distance sufficient to move the floating piston 360 upward some amount and increase the pressure in the internally-pressurized chamber 380 from 100 psi to 150 psi. This 150 psi pressure, of course, acts on the large end of the intensifier piston 450 and now approximately 600 psi pressure (basic 4:1 ratio) is required at the small end of the intensifier piston 350 in order for it to remain open, allowing continuation of the compression stroke. With 600 psi now acting on the 0.2 square inch cross-sectional area of the piston rod 320 a 120-pound "dynamic nose force" is now produced. In other words, as the compression stroke continues and the damping piston 340 and piston rod 320 travel further into the damper cylinder 350, the volume of hydraulic fluid displaced by the piston rod 320 causes the floating piston 360 to move upward, which increases the pressure in the internally-pressurized chamber 380, which increases the compression damping effect produced by the pressure intensifier damper arrangement, including the intensifier piston 450.

Put another way, the embodiment of U.S. Pat. No. 7,374,028 produces a "position-sensitive" compression damping effect, with the compression damping force increasing as the piston rod 320 and the damping piston 340 moves further into the damper cylinder 350. The extent and degree of this position-sensitive effect is influenced by the pre-set volume of the internally-pressurized chamber 380 above the floating piston 360, relative to the diameter and maximum available travel of the piston rod 320. If the pre-set volume of the internally-pressurized chamber 380 is relatively large, the position-sensitive effect is reduced. If the pre-set volume is relatively small, the position-sensitive effect is increased.

In one embodiment one or both of the valves 210, 220 comprise standard shim-type dampers. In one embodiment one or both of the valves 210, 220 include an adjustable needle for low speed bleed. In one embodiment a blow off (e.g. checking poppet-type or shim) is included in one of the flow paths associated with the valves 210, 220.

As in other embodiments, the remotely-operable valve 220 may be solenoid or hydraulically operated or pneumatically operated or operated by any other suitable motive mechanism. The valve may be operated remotely by a switch or potentiometer located in the cockpit of a vehicle or attached to appropriate operational parts of a vehicle for timely activation (e.g. brake pedal) or may be operated in response to input from a microprocessor (e.g. calculating desired settings based on vehicle acceleration sensor data) or any suitable combination of activation means. In like manner, a controller for the adjustable pressure source (or for both the source and the valve) may be cockpit mounted and may be manually adjustable or microprocessor controlled or both or selectively either.

One embodiment comprises a four wheeled vehicle having solenoid valve equipped shock absorbers at each (of four) wheel. The solenoid valve (which in one embodiment is cable operated instead of solenoid operated) of each of the front shock absorbers may be electrically connected with a linear switch (such as that which operates an automotive brake light) that is activated in conjunction with the vehicle brake pedal. When the brake pedal is depressed beyond a certain distance, corresponding usually to harder braking and hence potential for vehicle nose dive, the electric switch connects a power supply to the normally open solenoid in each of the front shocks thereby closing the damping fluid flow paths in those shocks. As such the front shocks become more rigid during hard braking. Other mechanisms may be used to trigger the shocks such as accelerometers (e.g. tri-axial) for sensing pitch and roll of the vehicle and activating, via a microprocessor, the appropriate solenoid valves for optimum vehicle control.

In one embodiment, a vehicle steering column includes right turn and left turn limit switches such that a hard turn in either direction activates (e.g. closes path 8SA) the solenoid on the shocks opposite that direction (for example a hard right turn would cause more rigid shocks on the vehicle left side). Again, accelerometers in conjunction with a microprocessor and a switched power supply may perform the solenoid activation function by sensing the actual g-force associated with the turn (or braking; or throttle acceleration for the rear shock activation) and triggering the appropriate solenoid(s) at a preset threshold g-force.

In one embodiment a remotely-operable valve 220 like the one described above is particularly useful with an on-/off-road vehicle. These vehicles can have as more than 20" of shock absorber travel to permit them to negotiate rough, uneven terrain at speed with usable shock absorbing function. In off-road applications, compliant dampening is necessary as the vehicle relies on its long travel suspension when encountering often large off-road obstacles. Operating a vehicle with very compliant, long travel suspension on a smooth road at higher speeds can be problematic due to the springiness/sponginess of the suspension and corresponding vehicle handling problems associated with that (e.g. turning roll, braking pitch). Such compliance can cause reduced handling characteristics and even loss of control. Such control issues can be pronounced when cornering at high speed as a compliant, long travel vehicle may tend to roll excessively. Similarly, such a vehicle may pitch and yaw excessively during braking and acceleration. With the remotely-operated bypass dampening and "lock out" described herein, dampening characteristics of a shock absorber can be completely changed from a compliantly dampened "springy" arrangement to a highly dampened and "stiffer" (or fully locked out) system ideal for higher speeds on a smooth road. In one embodiment, where compression flow through the damper piston 105 is completely blocked, closure of the valve 220 can result in substantial "lock out" of the suspension (the suspension is rendered essentially rigid except for the movement of fluid through shimmed valve 210). In one embodiment, where some compression flow is allowed through the damper piston 105 or the annular bypass 150, closure of the valve 220 results in a stiffer but still functional compression damper.

In addition to, or in lieu of, the simple, switch operated remote arrangement, the remotely-operable valve 220 can be operated automatically based upon one or more driving conditions such as vehicle speed, damper rod speed, and damper rod position. One embodiment of the arrangement may automatically increase dampening in a shock absorber in the event a damper rod reaches a certain velocity in its travel towards the bottom end of a damper at a predetermined speed of the vehicle. In one embodiment, the damping (and control) increases in the event of rapid operation (e.g. high damper rod velocity) of the damper to avoid a bottoming out of the damper rod as well as a loss of control that can accompany rapid compression of a shock absorber with a relative long amount of travel. In one embodiment, damping increases (e.g. closes or throttles down the bypass) in the event that the damper rod velocity in compression is relatively low but the damper rod progresses past a certain point in the travel. Such configuration aids in stabilizing the vehicle against excessive low-rate suspension movement events such as cornering roll, braking and acceleration yaw and pitch and "g-out."

While the examples illustrated relate to manual operation and automated operation based upon specific parameters, the remotely-operated valve 220 (with or without valve 210) can be used in a variety of ways with many different driving and road variables. In one example, the valve 220 is controlled based upon vehicle speed in conjunction with the angular location of the vehicle's steering wheel. In this manner, by sensing the steering wheel turn severity (angle of rotation), additional dampening can be applied to one damper or one set of dampers on one side of the vehicle (suitable for example to mitigate cornering roll) in the event of a sharp turn at a relatively high speed. In another example, a transducer, such as an accelerometer, measures other aspects of the vehicle's suspension system, like axle force and/or moments applied to various parts of the vehicle, like steering tie damper rods, and directs change to the bypass valve positioning in response thereto. In another example, the bypass can be controlled at least in part by a pressure transducer measuring pressure in a vehicle tire and adding dampening characteristics to some or all of the wheels in the event of, for example, an increased or decreased pressure reading. In one embodiment, the damper bypass or bypasses are controlled in response to braking pressure (as measured, for example, by a brake pedal sensor or brake fluid pressure sensor or accelerometer). In still another example, a parameter might include a gyroscopic mechanism that monitors vehicle trajectory and identifies a "spin-out" or other loss of control condition and adds and/or reduces dampening to some or all of the vehicle's dampers in the event of a loss of control to help the operator of the vehicle to regain control.

While the foregoing is directed to certain embodiments, other and further embodiments may be implemented without departing from the scope of the present technology, and the scope thereof is determined by the claims that follow.

What I claim is:

1. A vehicle damper comprising:
   a cylinder;
   a piston within said cylinder;
   a working fluid within said cylinder;
   a reservoir in fluid communication with said cylinder via said working fluid, said reservoir operable to receive said working fluid from said cylinder in a compression stroke;
   a flow path starting in said cylinder and ending in said reservoir; and
   a reservoir valve assembly disposed in said flow path, said reservoir valve assembly being configured for monitoring a flow of said working fluid into a reservoir fluid portion of said reservoir, wherein said reservoir valve assembly comprises at least a base valve, a remotely-operable valve, and a third reservoir valve that is not said base valve and said remotely operable valve, said third reservoir valve disposed in a first chamber, wherein said third reservoir valve is positioned upstream of said remotely operable valve during said compression stroke, wherein said base valve provides a positive damping resistance regardless of a compliant damping or a rigid damping pressure being applied separate from said positive damping resistance such that said flow of said working fluid through said base valve occurs under all circumstances, said remotely operable valve disposed in a second chamber adjacent said third reservoir valve, said remotely operable valve configured to control flow of said working fluid through said second chamber,
   wherein said remotely-operable valve has an open position and a closed position, wherein said open position allows at least a portion of the whole of said working fluid to by-pass said third reservoir valve and move through said remotely-operable valve to said base valve.

2. The vehicle damper of claim 1, wherein said piston comprises:
   at least one flow path through which said working fluid meters from a first side of said piston to a second side of said piston.

3. The vehicle damper of claim 2, further comprising:
   at least one shim coupled with said at least one flow path, wherein said at least one shim at least partially obstructs said at least one flow path.

4. The vehicle damper of claim 3, wherein said at least one flow path comprises:
   a first flow path that is unrestricted, thereby allowing by-pass of said working fluid during said compression stroke.

5. The vehicle damper of claim 3, wherein said at least one flow path comprises:
   a second flow path that is restricted by said at least one shim, thereby allowing a damping of a flow of said working fluid during said compression stroke.

6. The vehicle damper of claim 1, wherein said cylinder comprises:
a compression portion partially defined by a first side of said piston; and
a rebound chamber partially defined by a second side of said piston; and
a by-pass shut off valve positioned toward an end of said compression portion, wherein said by-pass shut off valve is biased away from said end of said compression portion by a spring, wherein during said compression stroke, said piston moves toward said by-pass shut off valve until a surface of said by-pass shut off valve abuts a radially outer portion of a leading surface facing said compression portion of said piston, at which point during said compression stroke, said surface of said by-pass shut off valve covers all ports located along an outer edge of said piston, wherein said working fluid remaining in said compression portion traverses said piston via ports located inward of said outer edge of said piston which are not covered by said by-pass shut off valve.

7. The vehicle damper of claim 6, wherein said by-pass shut off valve is movable with said leading surface of said piston toward an end of said compression portion.

8. The vehicle damper of claim 1, further comprising:
a compression portion partially defined by a first side of said piston;
a rebound chamber partially defined by a second side of said piston, said rebound chamber comprising a rebound chamber therein configured to hold said working fluid;
a damper rod positioned within said cylinder, wherein a first end of said damper rod is coupled to said piston that is surrounding said damper rod and configured to move with said damper rod during said compression stroke or a rebound stroke;
a central flow path within said damper rod;
a first set of radially outward directed flow paths positioned within said damper rod and adjacent to said rebound chamber; and
a second set of radially outward directed flow paths positioned within said damper rod and adjacent to said piston, said second set of radially outward directed flow paths traverse shim valves before opening into a compression chamber of said compression portion, wherein during a rebound stroke, said working fluid within said rebound chamber flows into said first set of radially outward directed flow paths as said damper rod moves outward from said compression portion, moves into said central flow path, and then moves to said second set of radially outward directed flow paths.

9. The vehicle damper of claim 8, further comprising:
a first sleeve having a diameter that is smaller than a diameter of said cylinder and being within said rebound chamber, an inner surface of said first sleeve surrounding a portion of an outer surface of said damper rod; and
a shut off valve positioned at a first end of said first sleeve, wherein upon said first set of radially outward directed flow paths being covered by said inner surface of said first sleeve at said shut off valve, flow of said working fluid there through is terminated.

10. The vehicle damper of claim 1, wherein said reservoir comprises:
a reservoir fluid portion configured for filling with said working fluid during said compression stroke;
a floating piston; and
a gas portion positioned in between and coupled to said reservoir fluid portion and said floating piston, said gas portion being compressible as said reservoir fluid portion fills with said working fluid.

11. The vehicle damper of claim 10, wherein said vehicle damper comprises:
a gas valve located at a lower end of said reservoir, said gas valve configured for adjusting a pressure of gas in said gas portion via introduction of compressed air through said gas valve.

12. The vehicle damper of claim 1, wherein said reservoir valve assembly comprises:
a pathway leading from a fluid conduit into said reservoir fluid portion, wherein said fluid conduit houses said flow path between said cylinder and said reservoir.

13. The vehicle damper of claim 12, wherein one of said base valve and said third reservoir valve comprises:
a first set of shims configured for providing a predetermined resistance to said flow of said working fluid passing into said reservoir during said compression stroke.

14. The vehicle damper of claim 13, wherein the other one of said base valve and said third reservoir comprises:
a second set of shims configured for metering said flow of said working fluid out of said reservoir fluid portion during a rebound stroke of said vehicle damper.

15. The vehicle damper of claim 12, further comprising:
a pressure intensifier damper arrangement positioned within said pathway, such that said remotely-operable valve is enabled to control a flow of said working fluid, thereby creating a damping effect, wherein said damping effect is additive to the results of a functioning of said reservoir valve assembly.

16. The vehicle damper of claim 1, wherein said remotely-operable valve comprises:
a seat; and
a moveable plunger that is substantially sealable on said seat, wherein when said movable plunger is substantially sealed on said seat, said remotely-operable valve is in a substantially closed position, thereby preventing at least a portion of said working fluid from passing there through.

17. The vehicle damper of claim 16, further comprising:
a solenoid coupled to said remotely-operable valve, said solenoid configured for receiving an electrical signal and causing a mechanical movement of said plunger, wherein said mechanical movement comprises a shift between a substantially open position and said substantially closed position, wherein when said remotely-operable valve is in said substantially open position, said working fluid is capable of flowing through said remotely-operable valve.

18. The vehicle damper of claim 17, wherein said solenoid comprises:
a selectable stroke functionality configured for partially closing and partially opening said remotely-operable valve, thereby at least one of permitting and restricting flow of said working fluid there through without completely opening or closing said remotely-operable valve.

19. The vehicle damper of claim 17, wherein said electrical signal comprises:
a sensed g-force.

20. The vehicle damper of claim 16, further comprising:
a cable coupled to said remotely-operable valve, said cable configured for receiving a mechanically induced instruction and causing a mechanical movement of said plunger, wherein said mechanical movement comprises a shift between a substantially open position and said substantially closed position, wherein when said remotely-operable valve is in said substantially open position, said working fluid is capable of flowing through said remotely-operable valve.

21. The vehicle damper of claim 16, further comprising:
a pneumatically functioning unit coupled to said remotely-operable valve, said pneumatically functioning unit configured for causing a mechanical movement of said plunger, wherein said mechanical movement comprises a shift between a substantially open position and said substantially closed position, wherein when said remotely-operable valve is in said substantially open position, said working fluid is capable of flowing through said remotely-operable valve.

22. The vehicle damper of claim 16, further comprising:
a hydraulically functioning unit coupled to said remotely-operable valve, said hydraulically functioning unit configured for causing a mechanical movement of said plunger, wherein said mechanical movement comprises a shift between a substantially open position and said substantially closed position, wherein when said remotely-operable valve is in said substantially open position, said working fluid is capable of flowing through said remotely-operable valve.

* * * * *